United States Patent [19]
Durkin et al.

[11] Patent Number: 5,696,786
[45] Date of Patent: Dec. 9, 1997

[54] SOLID-STATE LASER SYSTEM

[75] Inventors: Peter S. Durkin, Albuquerque, N. Mex.; Axel Mehnert, München, Germany; Peter Peuser, Riemerling, Germany; Nikolaus Peter Schmitt, Munich, Germany

[73] Assignee: The United States of America as represented by the Secretary of the Air Force, Washington, D.C.

[21] Appl. No.: 283,479

[22] Filed: Jul. 29, 1994

Related U.S. Application Data

[63] Continuation-in-part of Ser. No. 48,606, Apr. 15, 1993, abandoned.
[51] Int. Cl.$^6$ .............................. H01S 3/091; H01S 3/094
[52] U.S. Cl. .............................. 372/75; 372/68; 372/93
[58] Field of Search .............................. 372/41, 68, 75, 372/93, 97

[56] References Cited

U.S. PATENT DOCUMENTS 5,237,584  8/1993  Shannon et al. .................. 372/93
5,271,031 12/1993  Baer .................................. 372/93
5,325,390  6/1994  Tidwell .............................. 372/99

*Primary Examiner*—Rodney B. Bovernick
*Assistant Examiner*—Robert E. Wise
*Attorney, Agent, or Firm*—Thomas C. Stover

[57] ABSTRACT

The present invention provides a laser diode-pumped solid-state laser resonator which can be scaled and pumped longitudinally including in a folded or zig-zag resonator cavity. The resonator employs opposed laser rod crystals paired with pump light diodes in a configuration which ensures good spatial overlap and can permit the simultaneous generation of one or more laser wavelengths. The resonator also has at one end thereof a total reflector, eg. a laser rod crystal or a mirror and at the other end thereof, a partial reflector i.e. a mirror, to resonate and amplify the laser beam in the system and outcouple a portion thereof as desired.

22 Claims, 5 Drawing Sheets

SOLID-STATE LASER SYSTEM

RELATED APPLICATION

This application is a continuation-in-part of application Ser. No. 08/048,606, now abandoned, filed 15 Apr. 1993 and having the same title.

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to a solid-state laser system, particularly one that is efficient and of high power.

2. Prior Art

It is known that semiconductor laser diode-pumped solid-state lasers offer substantial advantages over conventional laser systems. Such advantages include the good spatial overlap of the laser semiconductor diode-pump and solid-absorption wavelengths, which makes this laser system highly efficient. With longitudinal pumping moreover, laser diode radiation can be effectively focused in the solid-state laser cavity, the good spatial overlap above, contributing to high conversion efficiency values.

Because available pump laser diodes achieve only limited output power levels, solid-state lasers can be scaled to high pumping efficiencies only by designing large numbers of pump laser diodes into the laser system. This, however, no longer permits effective longitudinal focusing within the mode volume with good overlap. Crystal destruction thresholds, furthermore, limit the pump light output that can be coupled longitudinally into a laser crystal, which means that only limited output levels can be coupled into a crystal at a single point. In most instances, this requires a switch to what is termed transverse pumping, which means the pump laser diodes must be mounted laterally and at right angles to the laser mode. This, however, substantially reduces the spatial overlap between laser mode and pump emission.

In IEEE J. Q. E., 26 (1990), p. 827 ff., C. Pfister et al. suggest configurations which minimize these difficulties. In German Patent 40 41 133 (int. AZ. 11033) and German Patent Application P 40 08 225.3-33 (int. Az 10868), the applicant describes two methods also designed to deal with these problems. The so-called "zig-zag slab geometry" has been offered as another solution. All these proposed solutions, however, suffer from a common drawback, namely that they all require a relatively large number of sizable solid-state laser crystals, which, (both for reasons of economy and, depending on the type of crystal involved, because such single crystals have to be of a particular degree of optical homogeneity and quality) are difficult to obtain, expensive and entails substantial waste as well.

Accordingly there is need and market for a solid-state laser system that overcomes the above prior art shortcomings.

There has now been discovered a solid-state laser system which offers good spatial overlap during pumping, can be scaled to higher output power levels and at the same time, is capable of generating a range of laser wavelengths.

SUMMARY OF THE INVENTION

Broadly the present invention provides a semiconductor laser diode-pumped solid-state resonator system that has at least two spaced and opposed laser rod crystals which act as total reflectors. Also provided is at least one mirror opposed to at least one of the crystals which mirror can be a total or partial reflector. The invention further provides semiconductor diode means optically associated with each of the crystals to pump the crystals to generate a laser beam therebetween.

The above crystals and mirror form a resonator with the entering and exiting laser beams forming an acute angle with one another in such crystals.

The laser resonator system of the invention is preferably folded (e.g. in a zig-zag pattern) and such resonator system has at one end a total reflector (e.g. a laser rod crystal or a mirror) and at the other end thereof, a partial reflector (e.g. a mirror) to resonate one or more laser beams therein and outcouple a portion thereof as desired.

Accordingly in the respective embodiments of the invention, the resonator system can have at the ends of the resonator: a) a mirror at each end and b) a laser rod crystal at one end and a mirror at the other end. Also one or more of the laser rod crystals can be replaced by mirrors as desired within the scope of the present invention.

BRIEF DESCRIPTION OF THE DRAWINGS

The invention will become more apparent from the following detailed, specification and drawings in which.

DESCRIPTION OF PREFERRED EMBODIMENTS

Figure 1:
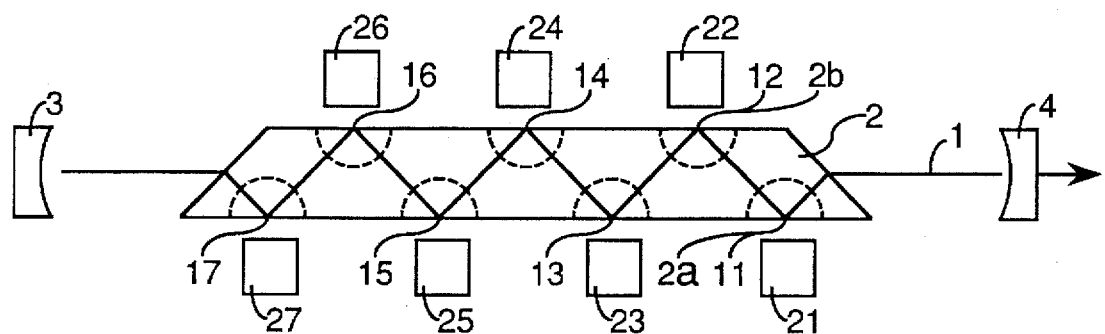
FIG. 1 is a schematic diagram of a zig-zag slab laser crystal of the prior art with a corresponding beam path.

Referring in more detail to the drawings, in the prior art or conventional Brewster zig-zag slab laser crystal shown in FIG. 1, the resonator beam 1 is refracted upon entry into laser crystal (2) such that it is refracted by crystal facet (2a) at point (11) and projected upon the opposing facet (2b), which in turn at point (12) produces total reflection upon the original facet, (i.e., 2a etc.) The laser beam exits the crystal in a refracted state and strikes a laser mirror (3, 4), which reflects the beam back onto itself. Total reflection points (11–17) are easily accessible from the side, such that at each of these points a pump diode (21–27) can be placed whose emission will be absorbed within the portion of the crystal indicated by the broken line, so that when the beam passes through them these portions of the crystal contribute to laser amplification. As FIG. 1 clearly shows, the number of pump lasers used determines the length of the slab crystal. On the other hand, laser crystals made of conventional materials, Nd:YAG crystals, for example, the most commonly used, can be produced with good homogeneity with only limited dimensions.

Figure 2:
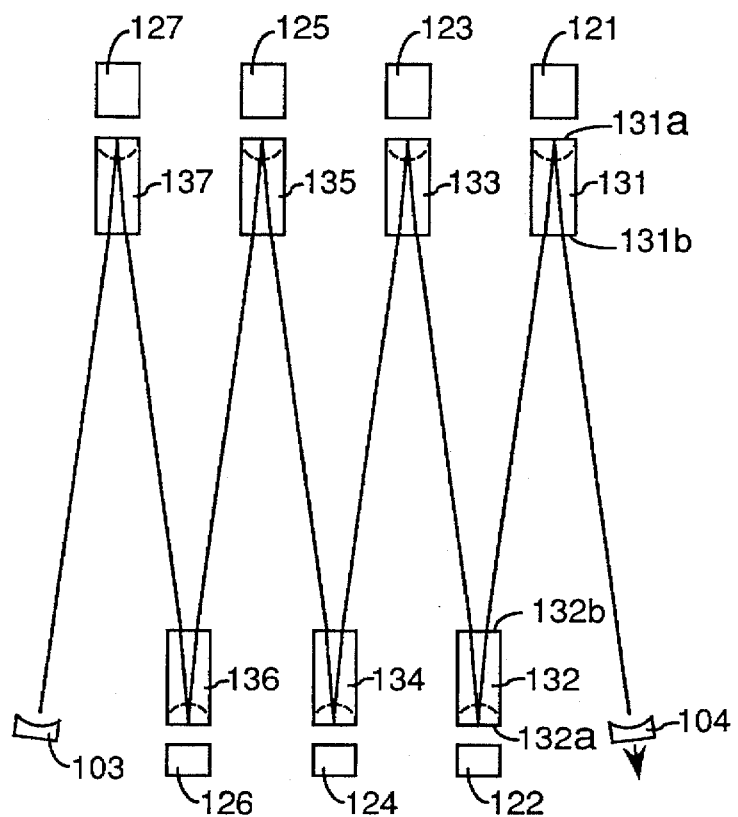
FIG. 2 is a schematic diagram of a corresponding or related zig-zag rod laser crystal structure embodying the present invention.

By way of remedy, however, the present invention now proposes the design shown in FIG. 2, which adds a small laser rod crystal (131–137) to each pump diode (121–127) in the beam path which in consequence of its (the rod crystal's) size alone, possesses the required homogeneity. Upon exiting from a rod crystal, whose pump-oriented facet (131, 132a, . . . ) is treated with a reflection-enhancing coating (ie. highly reflecting, HR) for the laser wavelength, the opposing facet (131b, 132b, . . . ) treated, as required, with a reflection-reducing coating (ie. highly transmitting, HT) for such wavelength, the beam is refracted and re-enters the next opposing laser rod crystal. The smaller angle of the resonator mode in the crystal permits better focusing of the pump light into the laser mode. The laser crystals themselves can be fabricated from rod crystals selected so as to permit operation both at higher efficiencies and with a larger number of pump units. The laser resonator so configured is confined by resonator mirrors 103 and 104, which mirrors define the ends of the resonator cavity.

The mirror 103 is highly reflecting (HR) and the mirror 104 is partially transmitting (PT) for the laser wavelength employed per FIG. 2.

Figure 10:
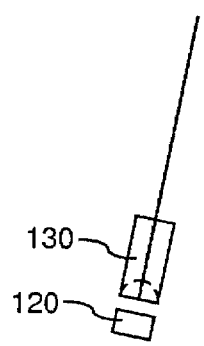

In another embodiment of the laser resonator system (LRS) of the invention, mirror 103 of FIG. 2 is replaced with laser rod crystal 130 (HR) and pump diode 120 as indicated in FIG. 10.

Figure 3:
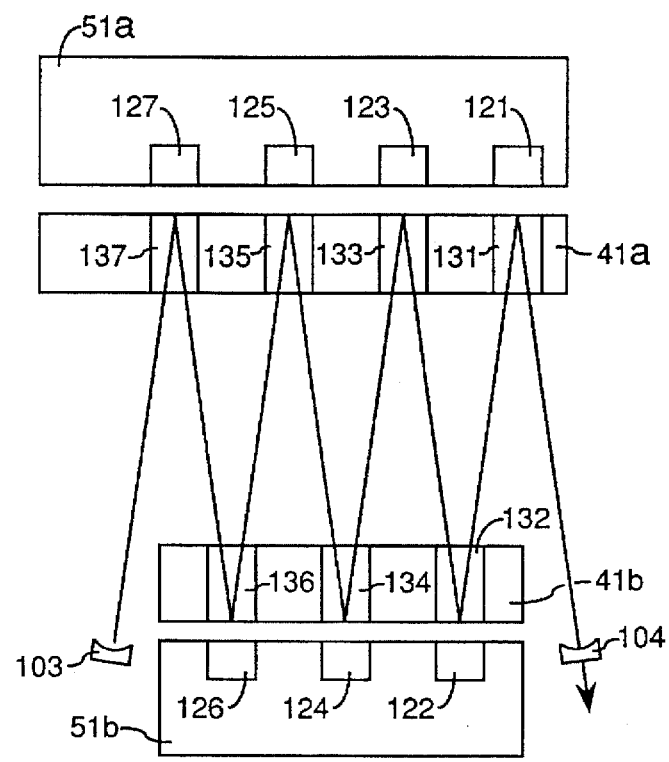
FIG. 3 is a schematic diagram of a preferred embodiment of the present invention which relates to that shown in FIG. 2.

The embodiment of FIG. 2 permits the incorporation of an ideal cooling system, as can be seen from FIG. 3. The laser crystals (131–137) are mounted in a coolant-carrying base chamber (41a, b). The crystals can be contained either together in a single chamber or divided between two separate chambers, one for each side, that is, according to FIG. 3, one base chamber (41a) for the odd-numbered laser crystals and a second chamber (41b) for the even-numbered crystals. Such a base cooling chamber can be made, for example, of a copper or silicon material incorporating cooling channels, or of a sapphire material, which can remain in close contact with a coolant. The same applies to the pump light units, which are also mounted on a common base (51a, b) as described above.

Figure 11:
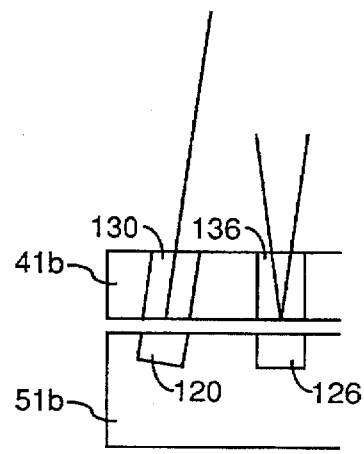

Again mirror 103 of FIG. 3 can be replaced with laser rod crystal 130 (HR) and pump diode 120 in cooling chambers 41b and 51b, respectively, as shown in FIG. 11.

Figure 4:
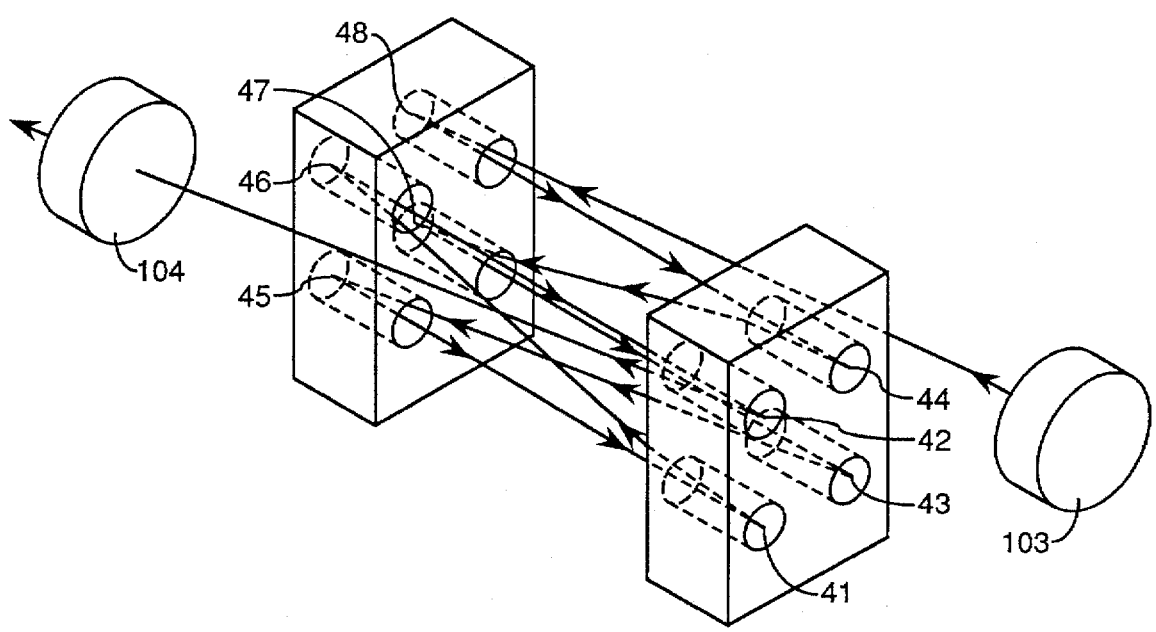
FIG. 4 is a perspective schematic view of an embodiment of the invention analagous to FIG. 3 with two-dimensional scaling.

FIG. 4 shows a similar embodiment for the single base chamber cooling system comprising several adjacent rows of laser rod crystals (41–48), which, accordingly, permits higher laser-component density.

Appropriately designed base-units and laser-crystal arrangements, of course, would permit still other beam path configurations. In German Patent Application P 40 08 225.3-33 (int. AZ. 10868), for example, the applicant describes a multi-reflection resonator comprising individual, collectively mounted laser crystals. In such device, a large section of the laser material is pumped longitudinally at several points arranged in a circle.

Figure 5:
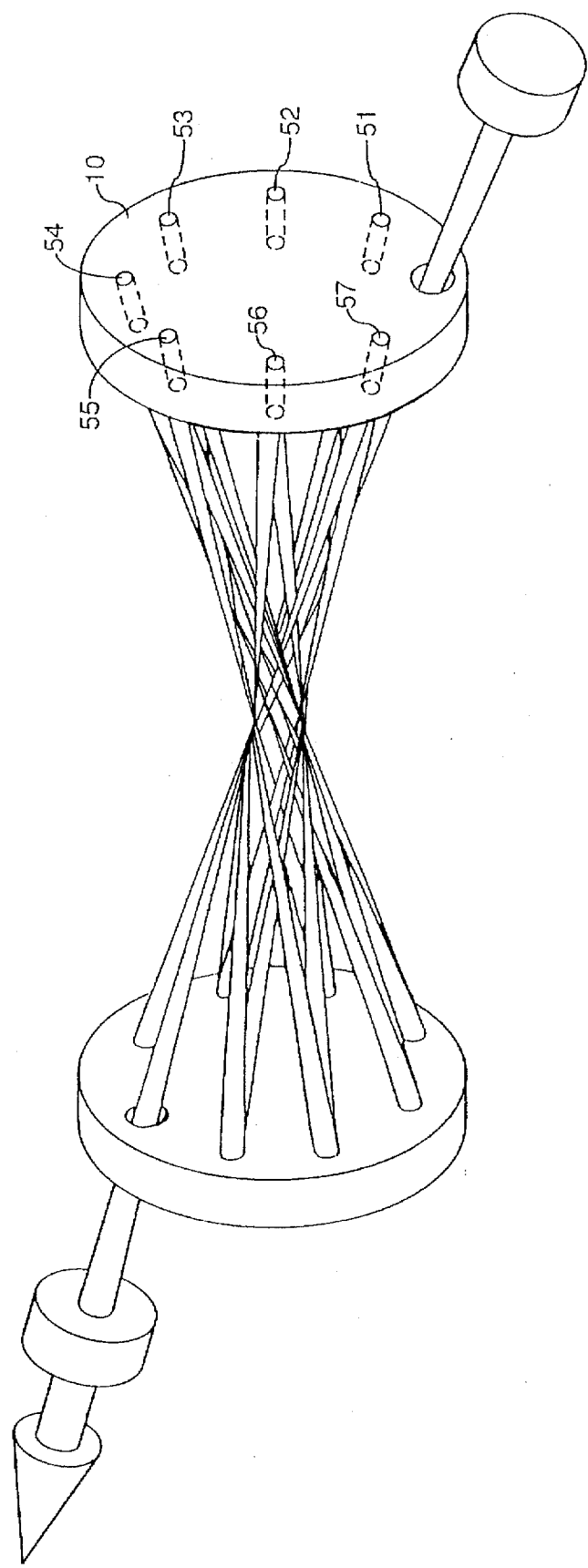
FIG. 5 is a perspective view of another embodiment of the laser resonator system of the present invention e.g. a multi-reflection-cell laser resonator.

A modified multi-reflection laser resonator embodying the present invention can therefore take the form shown in FIG. 5. Several small, homogeneous laser rod crystals (51–57) are placed at certain points in a mounting plate (10). The face of each laser crystal here is curved such that after each reflection the resonator mode is refocused into itself and so does not expand as it passes through the multi-reflection laser resonator.

Figure 6:
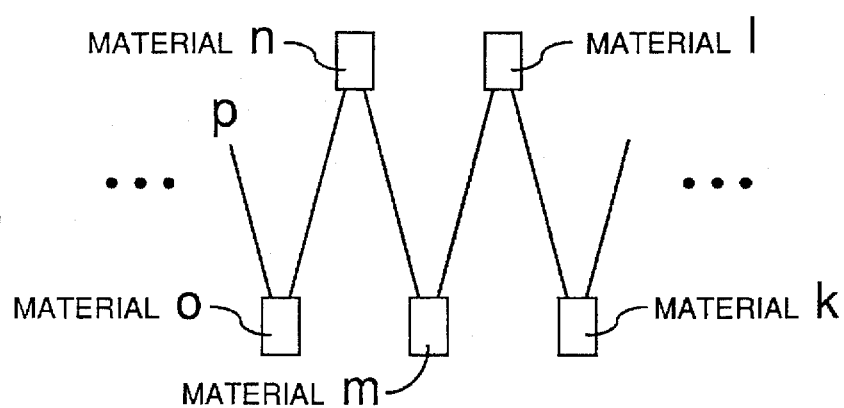
FIG. 6 is enlarged fragmentary schematic diagram of a laser resonator system embodiment of the invention that is related to FIG. 2, which embodiment uses different laser materials to generate polychromatic laser light, i.e. laser beams at different frequencies.

The use of a number of smaller individual single rod crystals in place of one large single crystal also offers the option of mounting different crystal materials (k-p) in a common laser resonator and in this way of generating laser light at several lines emitting simultaneously. This is shown in FIG. 6. As long as laser crystals k-p are tuned to one another such that there are no internal resonator losses (absorption, for example) for any of the desired emission lines, these materials can be freely combined with one another. Laser lines at 1, 2 and 3 u, for example, can be generated simultaneously. The use of crystals emitting in the red, green and blue regions, for example can permit the generation of a collinear beam of "white" laser light.

Figure 7:
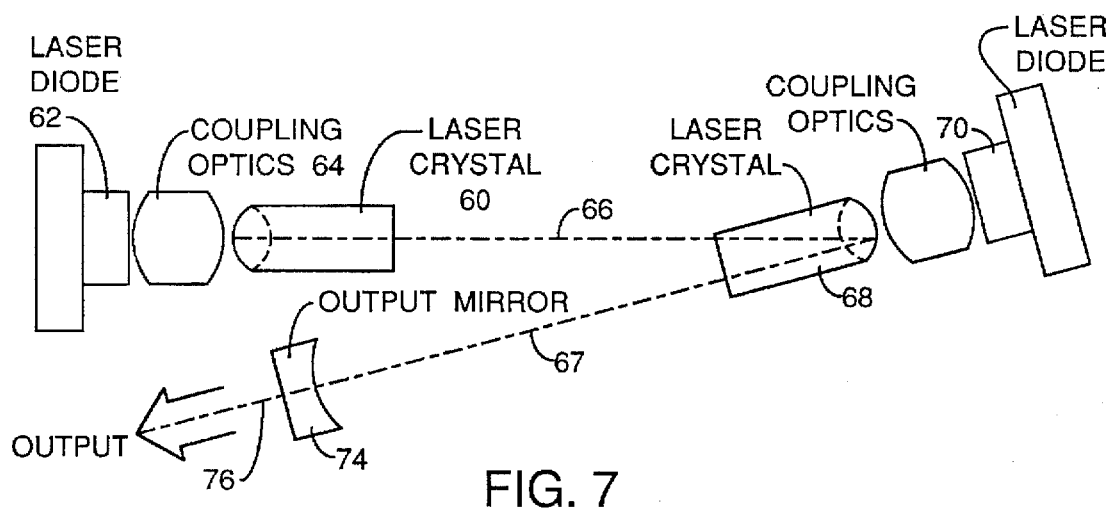
FIG. 7 is an enlarged schematic elevation diagram of another laser resonator system embodying the invention.
Figure 8:
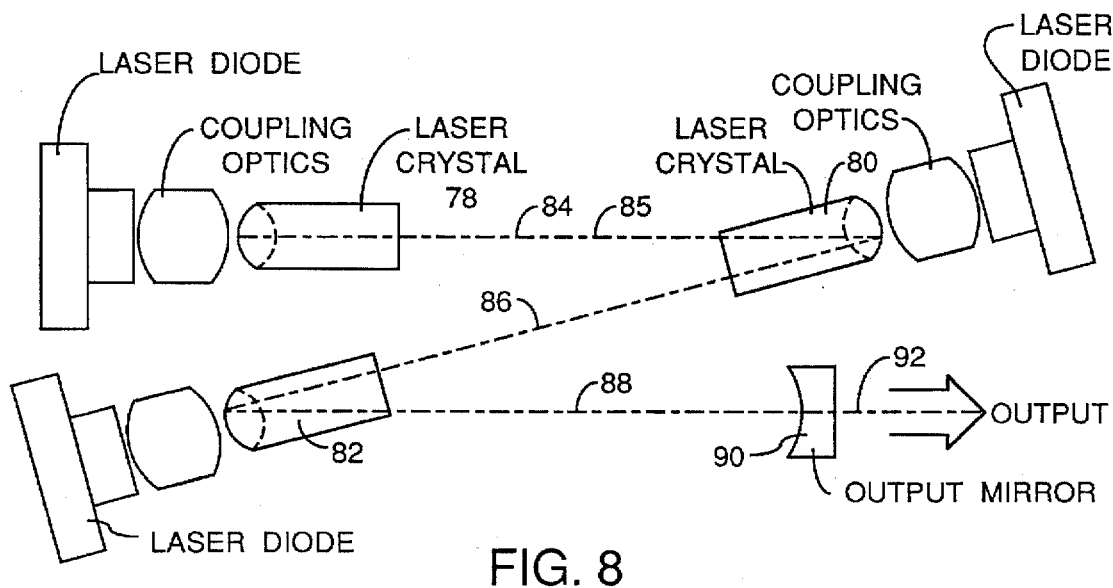
FIG. 8 is an enlarged elevation schematic view of yet another laser resonator system embodying the invention.
Figure 9:
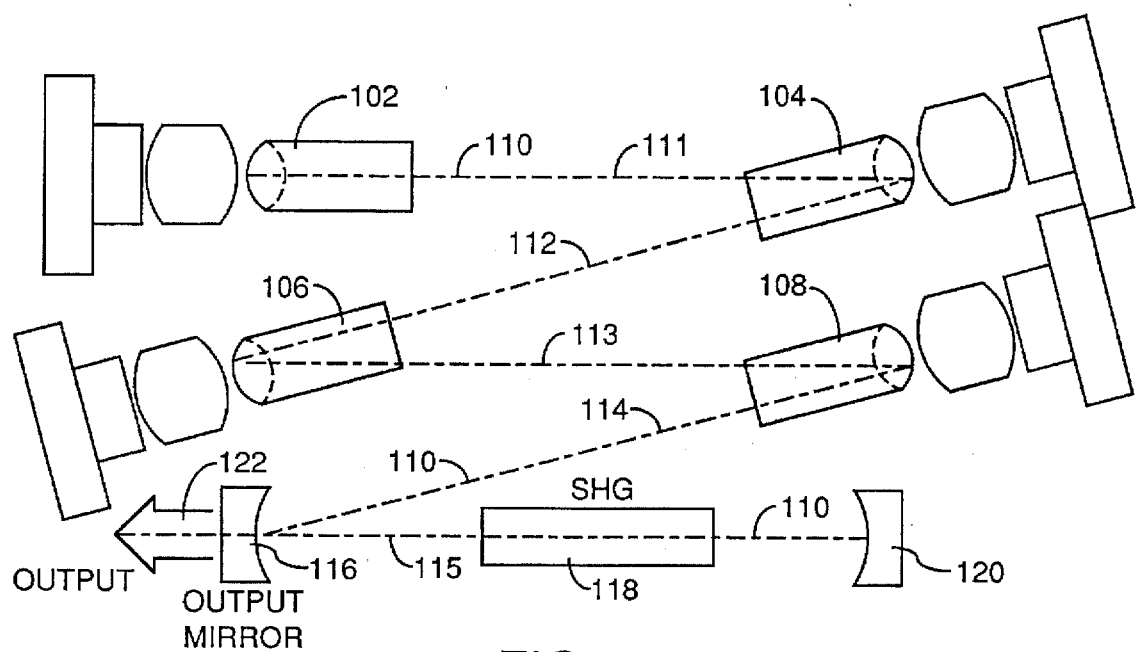
FIG. 9 is an enlarged elevation schematic view of still another laser resonator system embodiment of the present invention and FIGS. 10 and 11 are fragmentary schmatic views of other embodiments of the present invention.

Less complex embodiments of the invention than that shown in, e.g. FIG. 2 are shown (in more detail) in FIGS. 7, 8 and 9. Thus laser rod crystal 60, pumped (eg. at 808 nm) by diode 62 through coupling optics 64, emits laser beam 66 (eg. at 1064 nm) and enters the next opposing laser rod crystal 68 (which is pumped by laser diode 70) and reflects at an acute angle, along beam path 67 to partial reflector or output mirror 74, as shown in FIG. 7.

The output mirror 74 is coated partially transmissive (PT) to allow a small percentage of the laser beam to be outcoupled therethrough as output beam 76 and the remainder of the beam to be reflected therefrom and resonate back through the laser path 67 and 66 as indicated in FIG. 7.

Another embodiment of the LRS of the invention is shown in FIG. 8 where three pumped laser rod crystals 78, 80 and 82 are shown which generate a laser beam 84 along a path 85, 86 and 88. The beam 84 is partially reflected by output mirror 90 to resonate and amplify such beam 84 along the above path and to output a small percentage thereof as output beam 92 as shown in FIG. 8.

Another embodiment of the LRS of the invention is shown in FIG. 9 where pumped laser rod crystals 102, 104, 106 and 108 generate and reflect a laser beam 110 along a folded or zig-zag path 111, 112, 113 and 114, where such beam 110, e.g. at 1064 nm, reflects off output mirror 116 through SHG 118 and reflects off HR end mirror 120, which reflects such beam back through the SHG 118 to the output mirror 116, as shown in FIG. 9. The SHG 118 doubles the frequency of a portion of the laser beam 110 passing therethrough in each direction, so that the major part of the beam remains at a frequency of 1064 nm and a smaller part of the beam now has a frequency of 532 nm (green laser beam). The output mirror 116 is HR coated for the beam at 1064 nm and HT for the beam at 532 nm such that it reflects the 1064 beam back to laser rod crystal 108 so that it resonates and amplifies along the path 111, 112, 113, 114 and 115 while (most of) the green portion of the beam at 532 nm passes through the output mirror as output beam 122, as shown or indicated in FIG. 9. The end mirror 120 is HR coated at 1064 nm and 532 nm so as to be fully reflective at both wavelengths.

It will be apparent from the above description that additional pumped laser rod crystals and additional partially reflective and totally reflective mirrors can be added to the LRS of the invention to obtain more numerous opposed crystals and/or mirrors than shown in FIGS. 9 and 2 respectively. That is, one can keep adding, eg. pumped laser rod crystals to the zig-zag paths shown or indicated in FIGS. 7, 8, 9 and 10, within the scope of the present invention.

As indicated in FIGS. 2 and 3, partial and total reflectors can be mounted at the ends of the laser cavity in the form of mirrors 103 and 104, shown in FIGS. 2 and 3 or the HR mirror 103 can be replaced by a pumped laser rod crystal 130, as indicated in FIGS. 10 and 11.

Also one or more laser rod crystals can be replaced with mirrors in the LRS of the invention if desired, within the scope of the invention. For example, in FIG. 9, laser rod crystals 102 and 106 can be replaced with HR mirrors as another embodiment of the LRS of the present invention. Such substitution will of course reduce the intensity of the resonator laser beam as it will be pumped and amplified only by two laser rod crystals, 104 and 108 of FIG. 9. Also if desired, HR end mirror 120 and SHG 118 can be removed from such resonator in a simplified LRS within the scope of the present invention.

Thus one can replace one or more laser rod crystals in resonator circuits of the invention, to reduce the intensity of the resonating laser beam as well as the output thereof as desired per the invention.

What is claimed is:

1. A semiconductor laser diode-pumped solid-state laser resonator system (LRS) comprising,
   a) at least two spaced and opposed laser rod crystals which act as total reflectors,
   b) at least one mirror opposed to at least one of said crystals, which mirror can be a total or partial reflector and
   c) semiconductor diode means optically associated with each of said crystals to pump said crystals to generate a laser beam therebetween, which can be reflected and resonated between opposed reflectors to provide a plurality of entering and exiting beam segments therebetween, said crystals and said mirror forming a resonator and with said entering and exiting beam segments forming acute angles with one another in said crystals, which can be individually cooled said system having at one end of said resonator, a total reflector and at the other end thereof, a partial reflector to resonate and amplify said laser beam and outcouple a portion thereof as desired.

2. The laser system of claim 1 wherein said total reflector and said partial reflector are mirrors.

3. The laser system of claim 1 wherein said total reflector is a laser rod crystal and said partial reflector is an output mirror.

4. The laser system of claim 3 having in optical sequence between said reflectors from 3 to 7 or more laser rod crystals.

5. The laser system of claim 4 having an HR mirror opposed to said output mirror with an SHG mounted therebetween, said output mirror being HR at one frequency and HT at a second frequency that matches the second frequency generated by said SHG to output the beam portion at said second frequency through said output mirror and to reflect and resonate the remainder of said beam in said laser system.

6. The laser system of claim 4 wherein at least one of said laser rod crystals is replaced with an HR mirror.

7. The laser system of claim 6 wherein a plurality of said laser rod crystals are replaced with mirrors leaving however at least two laser rod crystals for beam amplification in the resonator.

8. The laser system of claim 1 wherein said crystals and pump diodes are mounted in at least one cooling chamber.

9. The laser system of claim 1 wherein said cooling chamber has copper or silicon cooling channels therein.

10. The laser system of claim 1 wherein of at least some of laser rod crystals are made of different materials to permit the generation of a plurality of laser wavelengths.

11. The laser system of claim 10 wherein of at least some of said laser rod crystals are made of different materials for simultaneous generation of multiple collinear wavelengths and simultaneous generation of red, green and blue light.

12. The laser system of claim 1 wherein each laser rod crystal is curved across a face thereof such that after each reflection, the laser beam refocuses into itself.

13. The laser system of claim 1 having at least two spaced laser rod crystals opposed by at least three spaced laser rod crystals.

14. The laser system of claim 1 having at least three spaced laser rod crystals opposed by at least four spaced laser rod crystals.

15. The laser system of claim 1 having a plurality of opposed laser rod crystals in a folded zig-zag resonator cavity, at least some of said crystals being of different material than other of said crystals to permit the generation of multiple laser wavelengths.

16. The laser system of claim 1 wherein one laser rod crystal and a spaced mirror are opposed by a rod crystal.

17. The laser system of claim 16 wherein said mirror is coated PT for 1064 nm.

18. The laser system of claim 1 wherein a pair of spaced laser rod crystals are opposed by a laser rod crystal and a mirror.

19. The laser system of claim 1, wherein two spaced laser rod crystals and a mirror are opposed by two spaced laser rod crystals and said mirror is also opposed by another mirror.

20. The semiconductor laser diode-pumped solid-state laser resonator system (LRS) comprising,
   a) at least two spaced and opposed laser rod crystals which act as total reflectors,
   b) at least one mirror opposed to at least one of said crystals, which mirror can be a total or partial reflector and
   c) a semiconductor pumped diode mounted proximate each of said crystals and matched therewith to provide longitudinal pumping with spatial overlap and to generate a laser beam in one or more of said crystals to define a system of laser rod crystals optically pumped at certain points along the length or circumference of said system and provide a plurality of entering and exiting beam segments between said crystals, said crystals and said mirror forming a common resonator and with said entering and exiting beam segments forming acute angles with one another in said crystals, which can be individually cooled said system having at one end of said resonator a total reflector and at the other end of said resonator a partial reflector to resonate said laser beam and outcouple a portion thereof.

21. The laser system of claim 20 wherein the surface of each of said crystals oriented towards said pump diode is configured to enhance reflection (HR) for a particular laser beam wavelength and the opposing side of each of said crystals is configured to reduce reflection (HT) for said laser beam wavelength such that upon exiting one of said laser crystals, the laser beam is appropriately refracted for entry into the next one of said laser crystals in the sequence.

22. The laser system of claim 21 wherein each laser rod crystal is curved across a face thereof such that after each reflection, the laser beam refocuses into itself.

* * * * *